(12) United States Patent
Hagg

(10) Patent No.: US 10,282,390 B2
(45) Date of Patent: May 7, 2019

(54) METHOD AND DEVICE FOR REPRODUCING A CONTENT ITEM

(71) Applicant: Sony Corporation, Tokyo (JP)

(72) Inventor: Wilhelm Hagg, Korb (DE)

(73) Assignee: Sony Corporation, Tokyo (JP)

( * ) Notice: Subject to any disclaimer, the term of this patent is extended or adjusted under 35 U.S.C. 154(b) by 146 days.

(21) Appl. No.: 14/617,100

(22) Filed: Feb. 9, 2015

(65) Prior Publication Data
US 2015/0242368 A1 Aug. 27, 2015

(30) Foreign Application Priority Data
Feb. 24, 2014 (EP) .................................. 14000647

(51) Int. Cl.
*G06F 17/21* (2006.01)
*G11B 19/02* (2006.01)
*G06F 3/0483* (2013.01)

(52) U.S. Cl.
CPC .......... *G06F 17/211* (2013.01); *G06F 3/0483* (2013.01); *G11B 19/02* (2013.01)

(58) Field of Classification Search
CPC .............................. G06F 3/0483; G11B 19/02
See application file for complete search history.

(56) References Cited

U.S. PATENT DOCUMENTS

| 7,536,079 | B2 | 5/2009 | Barron |
| 7,716,224 | B2 * | 5/2010 | Reztlaff, II ....... G06F 17/30613 707/741 |
| 8,234,282 | B2 * | 7/2012 | Retzlaff, II ....... G06F 17/30613 707/741 |
| 8,290,777 | B1 * | 10/2012 | Nguyen ................ G10L 13/00 345/156 |
| 8,793,575 | B1 * | 7/2014 | Lattyak ................. G09B 5/062 715/273 |
| 8,799,765 | B1 * | 8/2014 | MacInnis ............. G06F 17/241 715/230 |
| 8,803,817 | B1 * | 8/2014 | Froment ............... G06F 3/0488 345/1.1 |
| 8,832,319 | B2 * | 9/2014 | Kessel ................ H04L 67/1095 709/248 |
| 9,049,398 | B1 * | 6/2015 | Moscovich ............. H04N 1/40 |
| 9,158,741 | B1 * | 10/2015 | Hansen .................. G06F 3/0488 |

(Continued)

FOREIGN PATENT DOCUMENTS

| CN | 101835016 A | 9/2010 | |
| CN | 103686335 A * | 3/2014 | ........ H04N 21/4333 |
| JP | 2012-65102 | 3/2012 | |

OTHER PUBLICATIONS

Chinese Office Action dated Jun. 20, 2017 in Application No. 2015100873445, 19 pages (with English Translation).

*Primary Examiner* — Scott T Baderman
*Assistant Examiner* — Benjamin Smith
(74) *Attorney, Agent, or Firm* — Xsensus, LLP

(57) ABSTRACT

A method of reproducing a content item includes monitoring an input operation. At the input operation, it is decided whether to update a resume position, based on a reproduction progress, the reproduction progress being determined with respect to a reference position. The method further includes determining whether the input operation corresponds to a linear or to a non-linear event, and updating the reference position if the input operation is a non-linear event.

15 Claims, 10 Drawing Sheets

(56) References Cited

U.S. PATENT DOCUMENTS

| | | | | |
|---|---|---|---|---|
| 9,182,940 B1* | 11/2015 | Chen | ............... | G06F 17/30769 |
| 9,367,227 B1* | 6/2016 | Kim | ............... | G06F 3/04883 |
| 9,389,757 B1* | 7/2016 | Chen | ............... | G06F 3/0483 |
| 9,665,529 B1* | 5/2017 | Lattyak | ............... | G09B 5/062 |
| 9,715,482 B1* | 7/2017 | Bjorkegren | ............... | G06F 17/24 |
| 2002/0120635 A1* | 8/2002 | Joao | ............... | G09B 5/02 |
| 2002/0184189 A1* | 12/2002 | Hay | ............... | G06Q 30/06 |
| 2004/0228618 A1* | 11/2004 | Yoo | ............... | G11B 19/02 |
| | | | | 386/248 |
| 2007/0168413 A1* | 7/2007 | Barletta | ............... | G06F 3/04883 |
| | | | | 709/203 |
| 2008/0243828 A1* | 10/2008 | Reztlaff | ............... | G06F 17/30613 |
| 2008/0293450 A1* | 11/2008 | Ryan | ............... | G06F 17/30613 |
| | | | | 455/556.2 |
| 2008/0294674 A1* | 11/2008 | Reztlaff, II | ............... | G06F 17/30613 |
| 2009/0297130 A1* | 12/2009 | Otsuka | ............... | H04N 5/76 |
| | | | | 386/248 |
| 2010/0041000 A1* | 2/2010 | Glass | ............... | G09B 5/02 |
| | | | | 434/179 |
| 2010/0232766 A1* | 9/2010 | Kubota | ............... | H04N 5/783 |
| | | | | 386/291 |
| 2011/0153330 A1* | 6/2011 | Yazdani | ............... | G10L 13/00 |
| | | | | 704/260 |
| 2011/0200299 A1* | 8/2011 | Kitahara | ............... | G11B 27/105 |
| | | | | 386/239 |
| 2012/0078612 A1* | 3/2012 | Kandekar | ............... | G06F 17/2745 |
| | | | | 704/9 |
| 2012/0197998 A1* | 8/2012 | Kessel | ............... | H04L 67/1095 |
| | | | | 709/205 |
| 2012/0240036 A1* | 9/2012 | Howard | ............... | G06F 17/217 |
| | | | | 715/251 |
| 2013/0016102 A1* | 1/2013 | Look | ............... | G06T 15/20 |
| | | | | 345/426 |
| 2013/0219322 A1* | 8/2013 | Cranfill | ............... | G06F 17/30011 |
| | | | | 715/776 |
| 2015/0082136 A1* | 3/2015 | Cameron | ............... | G11B 27/005 |
| | | | | 715/203 |
| 2015/0169157 A1* | 6/2015 | Lu | ............... | H04N 21/4333 |
| | | | | 715/716 |
| 2015/0253883 A1* | 9/2015 | Takano | ............... | G06F 3/0485 |
| | | | | 345/173 |
| 2016/0048276 A1* | 2/2016 | Zhou | ............... | G06F 1/1694 |
| | | | | 345/173 |

* cited by examiner

METHOD AND DEVICE FOR REPRODUCING A CONTENT ITEM

FIELD OF THE DISCLOSURE

The present disclosure relates to a method and a device for reproducing a content item. The disclosure further relates to a computer program.

DESCRIPTION OF RELATED ART

The reproduction of content items such as movies, audiobooks or textbooks (e-books) on media presenters such as video/audio players, computers or e-book readers is widely known.

For example, when reading a textbook on a device for reproducing a content item such as an e-book reader, the current reading position within the book may be lost. For example, this can be caused by an action such as unintentionally touching the touchscreen, by a fly landing on the touchscreen, by searching for something within the e-book, by erroneously pushing the wrong control button or by another person using the same device. Usually, it is difficult to find the last viewing or reproduction position before this unintentional action has taken place.

According to existing technologies, the last consuming or reproduction position is offered as a resume position but usually, this last reproduction position corresponds to the position after the unintentional action has taken place. For example, after multiple skip operations, the last reproduction position no longer corresponds to the real consuming position.

This problem also occurs in further devices for reproducing a content item. For example, when watching a moving, the user may skip to different places. According to a further example, when reading a text such as an article in the internet, a user may follow several links. Thereafter, he may want to find his last true reading position.

SUMMARY

Hence, there is a need of providing an improved method and device for reproducing a content item.

According to an embodiment, a method of reproducing a content item, comprises monitoring an input operation, deciding, at the input operation, whether to update a resume position, based on a reproduction progress, the reproduction progress being determined with respect to a reference position, determining whether the input operation corresponds to a linear or to a non-linear event, and updating the reference position if the input operation is a non-linear event.

According to a further embodiment, a device for reproducing a content comprises a processor configured to determine a resume position. The processor is further configured to monitor an input operation, to decide, at the input operation, whether to update a resume position, based on a reproduction progress, the reproduction progress being determined with respect to a reference position, to determine whether the input operation corresponds to a linear or to a non-linear event, and to update the reference position if the input operation is a non-linear event.

According to an embodiment, a computer program includes computer-program instructions which when executed on a data processing apparatus cause the data processing apparatus to perform the method as recited above. According to a further embodiment, a non-transitory computer-readable recording medium includes the computer program.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
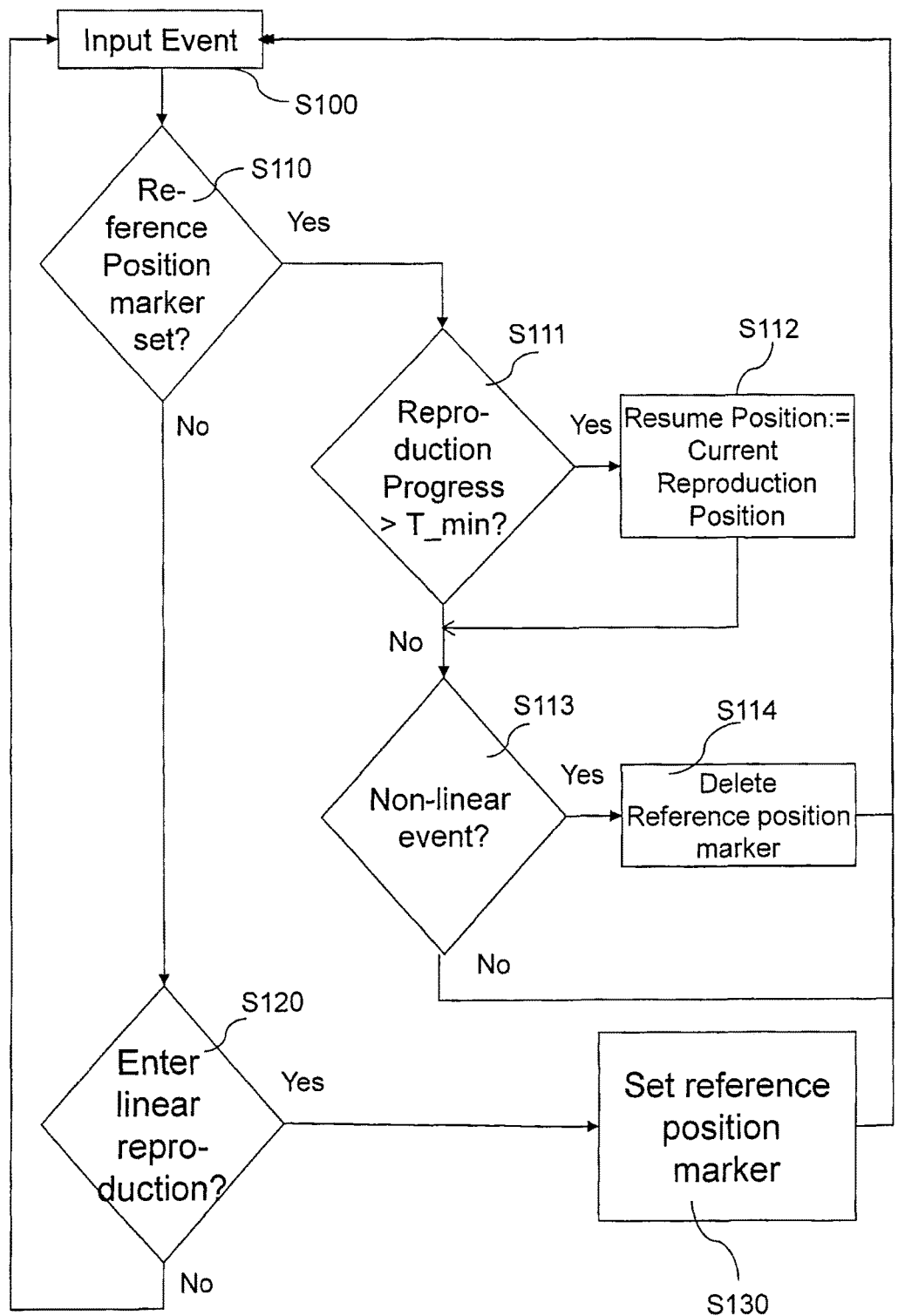
FIG. 1 illustrates a flow-chart of a method according to an embodiment.

In the accompanying drawings like reference numerals designate identical or corresponding parts throughout the several views.

In the context of the present specification the term "content item" or "content item to be reproduced" relates to any kind of reproducible content items such as video content items, movies, audio content items, music data, audiobooks, digital audio files, textbooks, e-books, music notes, scores, text documents, games, livestreams of video content, slideshows or slide presentations, livestreams of audiocontent and others. Among the content items, there may be content items that may be constantly reproduced, for example, video content items, movies, any kind of audio content items or even text which may be reproduced on a "word-by-word" basis, in which the difference between consecutive elements of the content item is hardly perceivable. Further, there may be content items that are reproduced in a discrete manner, for example, by turning over a page in case of an e-book, by scrolling one line after the other in a document or by moving to the next slide in case of a slideshow. The "reproduction position" and the related terms may be a reproduction time, a page number of an e-book, a line number of a document, a slide number of a slideshow, a chapter of an e-book, a movement of a piece of music and others. This term relates to any measurably unit of the content items to be reproduced.

The term "reproduction" may refer to any kind of playing back or displaying a movie or audio content or the contents of an e-book. The term "reproduction" may further relate to a cursor movement, for example, by scrolling through a document or content. This term may further relate to editing a document, for example, using a text editor.

A user may consume a content item, for example, by watching a movie, listening to music or an audio content item or reading a text and others. According to an embodiment, the user may "passively" consume the content, for example, without changing the content. According to a further embodiment, the user may "actively" consume the content. In the context of the present disclosure, the term "actively consume" is intended to mean that the user somehow interacts with the content. For example, the user may edit a document so as to change the document. According to a further example, the user may perform an action when playing a game, thereby changing or influencing the content.

The term "linear reproduction" may refer to any kind of "ordinary" playback, for example, playback of a video or playback of an audio content. The term "linear reproduction" may also comprise playback at a reduced speed, for example, playback at a speed that is slower than the real-time reproduction speed. In case of reproducing content that is reproduced in a discrete manner, the term "linear reproduction" may refer to a reproduction in which, for example, a page is turned over after a time period sufficient to enable reading, the reading position is moved from one line to the next after a time period sufficient to enable reading, or moving to the next slide after a time period sufficient to watch each of the slides. Further, a linear reproduction may comprise editing a document, for example, including inserting text in a document, wherein a cursor is moved to a certain position, and text is manually input or a copy and paste operation is performed.

According to a further interpretation, the term "linear reproduction" may refer to a reproduction in an intended order, e.g. when a slideshow comprising a plurality of slides is reproduced in an order that has been determined before, or when a document is read in an order that has been determined before. As is to be clearly understood, such a predetermined order may be implemented also in cases in which the reproduction order of the elements of the respective content item does not necessarily correspond to the physical order in which these elements are stored or transmitted.

The meaning of the term "non-linear event" may depend from the content to be reproduced. For example, a non-linear event may refer to a skip forward, a skip backward, a fast forward operation, a backward operation, a skip to the end/beginning, skip to an arbitrary position, or following links. For example, the links may be included in a table of contents or a listing of video chapters. A non-linear event may refer to skipping to a position within the same content to be reproduced or in another content file, for example, by following a link. For example, this may comprise watching a video on a web page. Usually, non-linear events are used during a search for a particular scene or text passage or by erroneously pushing the wrong button. It is assumed that users do not want to go back to that position later on until they really start consuming the media from that point for a certain time period. The term "non-linear event" may also refer to cases in which the elements of the content item are reproduced in a non-intended order.

Generally, linear reproduction and non-linear events may be distinguished by analysing a user's input operation. For example, if a user presses a "play" button, linear reproduction is assumed to take place, whereas a "jump to table of contents" command is interpreted as a non-linear event. According to further embodiments, this distinction may be assisted or replaced by tracking a user's behaviour, for example, using an output of a sensor. For example, the sensor may be a camera that tracks a user's eye movement. When the camera detects that the user's eye has consecutively moved over several lines of a text, it may be determined that a linear reproduction has been performed. According to a further embodiment, a touch sensor of a display may detect that the user has consecutively tracked several lines of a text with his finger. In this case, a linear reproduction may be determined. According to a further embodiment, a user may move the cursor in accordance with the read text so that linear reproduction may also be detected by analysing the cursor movement.

Further, a specific user's action may be defined to represent a linear reproduction. For example, editing a text by performing an input operation or performing a copy and paste operation may be defined to refer to a linear reproduction. Further methods of "actively consuming" the content item such as performing an input operation when playing a game may be defined to be a linear reproduction.

Embodiments provide a method of reproducing a content item, the method comprising deciding whether to update a resume position. According to an example, the resume position may be determined to correspond to the last reproduction position before the unintentional or searching action has taken place.

A method of reproducing a content item that may be constantly reproduced will be explained in the following. The content item may be a movie or an audio content item such as music or an audiobook. In case of reproduction of a movie, a linear reproduction may correspond to playing the movie or slowly playing the movie.

FIG. 1 shows a flow-chart of a method according to an embodiment. At step S100, an input event such as operating an input key or touching the touchscreen takes place. At step S110, it is determined whether a reference position marker has been set. The reference position marker helps to track a reference position for measuring or determining a reproduction progress. As long as a reference position marker is set, also a reference position is set at the position of the reference position marker. If no reference position marker is set, it is determined at S120 whether the input has initiated a linear reproduction operation. For example, a linear reproduction operation may correspond to a "play"-operation or to a play operation at a lower speed than at real time, e.g. a slow motion reproduction. If no linear reproduction has been initiated, the process proceeds to step S100. If a linear reproduction operation has been initiated, the reference position marker is set to the current reproduction position at S130 and the method returns to S100.

If at step S110 a reference position marker is already set, the reproduction progress is determined based on the reference position, e.g. by comparing the current reproduction position with the reference position indicated by the reference position marker. The current reproduction position corresponds to the position at which the input event or input operation takes place. It is determined at S111 whether the reproduction progress is larger than a threshold value T_min. If it is determined that the reproduction progress exceeds this threshold value, the resume position is set to the current reproduction position at step S112 and the procedure proceeds to step S113. If the reproduction progress does not exceed the threshold value T_min or arriving from step S112, it is determined at step S113 whether the input operation corresponds to a non-linear event. If the input operation corresponds to a non-linear event, the reference position marker is deleted at step S114. If the input operation corresponds to a linear event, the procedure returns to S100 while maintaining the reference position marker at the position which was set earlier.

Figure 2:
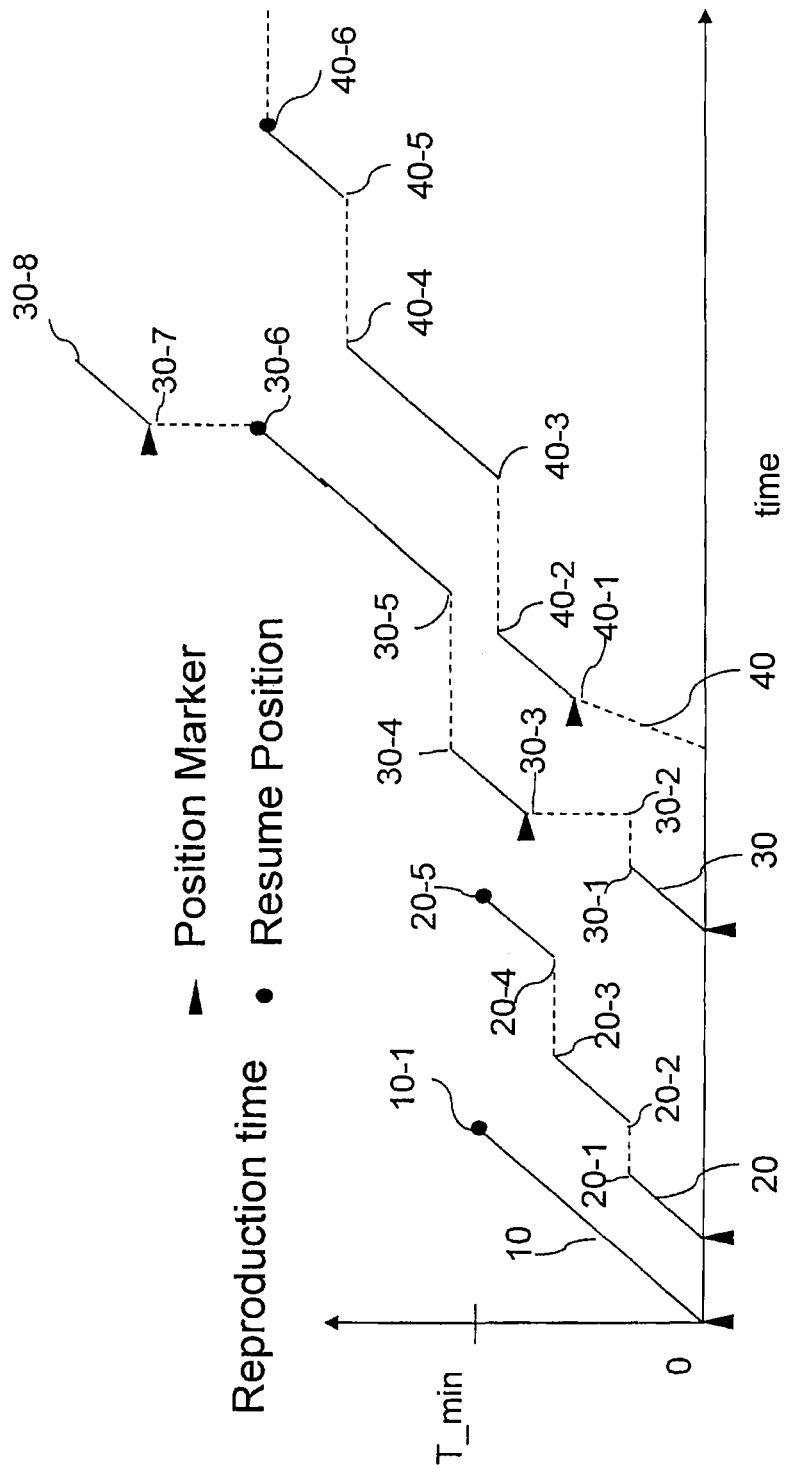
FIG. 2 shows a time-chart of several different reproduction scenarios.

FIG. 2 illustrates various methods of reproducing a content. For example, the content that is reproduced according to the time-chart shown in FIG. 2 may be a movie or audio content, i.e. content that is constantly reproduced under normal conditions. Time-chart 10 represents a linear playing of a content. For illustrating the present example, it is assumed that a movie is consumed. The presentation of the movie starts at a reproduction time that corresponds to 0, and the first input operation is performed at 10-1. Following the flow-chart illustrated in FIG. 1, at reproduction time=0, a first input event of pushing the play button is performed. At step S110 it is determined that no reference position marker has been set, proceeding to step S120. At step S120 it is determined that linear reproduction has been initiated by pushing the play-button and a reference position marker is set at S130. At the input operation at 10-1, it is determined that a reference position marker has already been set at S110. At S111, it is determined that the reproduction progress is greater than T_min and the resume position is set to the current reproduction position. Further, the procedure proceeds to step S113. Depending on the kind of input operation at 10-1, the reference position marker is deleted or not.

Time-chart 20 denotes a reproduction method, in which a movie is watched, being interrupted by several breaks. Until point 20-1, the curve is identical to the curve 10. At 20-1, a pause-button is pressed which does not correspond to a non-linear event. Accordingly, the procedure goes from S100 to S110 and then to S111, where it is determined that a reproduction position is smaller than T_min. At S113, it is determined that it is no non-linear event so that the procedure proceeds to S100. At position 20-2, watching the movie is resumed. Accordingly, the procedure goes from S100 to S110 to S111 and to S113 where it is determined that no non-linear event has been activated. Hence, the position marker is maintained. At 20-3, a further break occurs. Accordingly, the procedure goes from S100 to S110 to S111 and further to S113, where it is determined that no non-linear event has been activated. At position 20-4, watching is resumed so that the procedure again is followed from S100 to S110, to S111 and further S113. Finally, at position 20-5 when a further input operation takes place, the procedure goes from S110 to S111 where it is determined that the reproduction position is greater than T_min. Accordingly, the resume position is set to the current reproduction position. The procedure proceeds to S113, where depending on the input operation at 20-5 the reference position marker is deleted or not, and the procedure again goes to S100.

The first portion of the third time-chart 30 is almost identical to the first portion of curve 20. At point 30-1, watching is interrupted for a shorter break. At 30-2, a skip forward operation is performed. Accordingly, upon this input event at S100, the procedure goes to S110 and then to S111, where it is determined that the reproduction progress is smaller than T_min. The procedure proceeds to S113, where it is determined that a non-linear event has been activated. Accordingly, the reference position marker is deleted at S114. At 30-3, linear watching is resumed. Accordingly, the procedure proceeds from S100 to S110, where it is determined that no reference position marker is set (since it has been deleted at S114 before). At S120, it is determined that linear playback has been entered so that a reference position marker is set at 30-3. The procedure proceeds to position 30-4, at which watching is interrupted for a break. Watching is resumed at 30-5. At 30-6, a skip forward operation is performed. Accordingly, upon this input event at S111, it is determined that the reproduction progress is greater than T_min so that the resume position is set to the current reproduction position 30-6. The procedure proceeds to step S113, where it is determined that a non-linear event has been initiated. Accordingly, the reference position marker is deleted. At 30-7, linear reproduction is resumed. Starting from the input event at S100, the procedure proceeds to S110, where it is determined that no reference position marker is set. At S120, it is determined that linear reproduction has been entered. At S130, a reference position marker is set to the current reproduction position at 30-7. At 30-8, linear reproduction is interrupted and a skip forward operation is initiated. Accordingly, the procedure goes from S100 to S110, where it is determined that a reference position marker is set. The procedure goes to step S111, where it is determined that the reproduction progress is smaller than T_min. The procedure goes to S113, where it is determined that it is a non-linear event, so that the reference position marker is deleted at S114. If the user wants to resume reproduction from the stored resume position, reproduction will start from position 30-6, i.e. the last "valid" reproduction position.

According to the fourth time-chart 40, reproduction starts with a "fast forward" operation. Accordingly, the procedure goes from S100 to S110 and then from S120, where it is determined that no linear reproduction has been entered. At 40-1, the play button is activated. Accordingly, the procedure goes from S100 to S110 to S120, where it is determined that linear reproduction has been initiated and the reference position marker is set at S130. The procedure goes to 40-2, where a longer break starts and watching is resumed at 40-3. At 40-4, the reproduction process is interrupted for a break. Accordingly, it is determined that the reproduction progress is greater than T_min at S110 so that the resume position is set to the current reproduction position. The procedure proceeds to S113 where it is determined that no non-linear event has been initiated. Accordingly, the procedure proceeds directly to S100 while maintaining the reference position marker. At 40-5 linear reproduction is resumed so that the procedure proceeds from S100 to S110, S111, S113, without setting a resume position or deleting the reference position marker. At 40-6, the linear reproduction is interrupted by a break. The procedure proceeds from S100 to S110 and then to S111. At S111, it is determined that the reproduction progress is larger than T_min, so that the resume position is set to the current reproduction position. The resume position may be stored. The procedure proceeds to S113, where it is determined that no non-linear event has been entered. If after the break the reproduction is to be resumed from the stored resume position, the reproduction starts from the reproduction position stored at 40-6.

In the above embodiments, T_min may be about several minutes, for example, more than 30 seconds to 10 minutes, for example, 2 to 5 minutes. According to a further embodiment, a user may set a value of T_min according to his viewing characteristics. According to another embodiment, the device may be configured to learn an appropriate value of T_min by observing the user's watching behaviour.

According to the embodiment above, a pause in which the content item reproduction is not performed may not be regarded as a non-linear event nor is it regarded as a linear reproduction. More specifically, a pause corresponds to time without reproduction progress. According to embodiments, according to the user's needs, special events or portions of the content may be classified as being a non-linear event or a linear reproduction or as neither being a non-linear event nor a linear reproduction. For example, the device reproducing video content may consider a commercial break as being a linear reproduction. As a result, the resume position may be set to a position after the end of the commercial break, if upon an input event the reproduction progress is greater than the threshold value.

The method illustrated in FIG. 1 may also applied to cases in which the content item to be reproduced is a readable document such as a textbook or an e-book. Differing from the above case of watching a movie, in an e-book reader typically many non-linear events may be initiated by pressing the same buttons as for initiating a linear event. Accordingly, from pressing a dedicated button a specific event type may not be recognizable. Further, in an e-book reader, page change events and instructions such as "Go to Table of Contents" or "Go to Page . . . ", may be available. For each page change, it is assumed that it is known the page from which it is started and which page is currently shown. As will be explained hereinafter, for example, after a page change event, it may be determined whether this page change event corresponds to a linear reproduction or not by considering the time after which the next page change event takes place.

Figure 3:
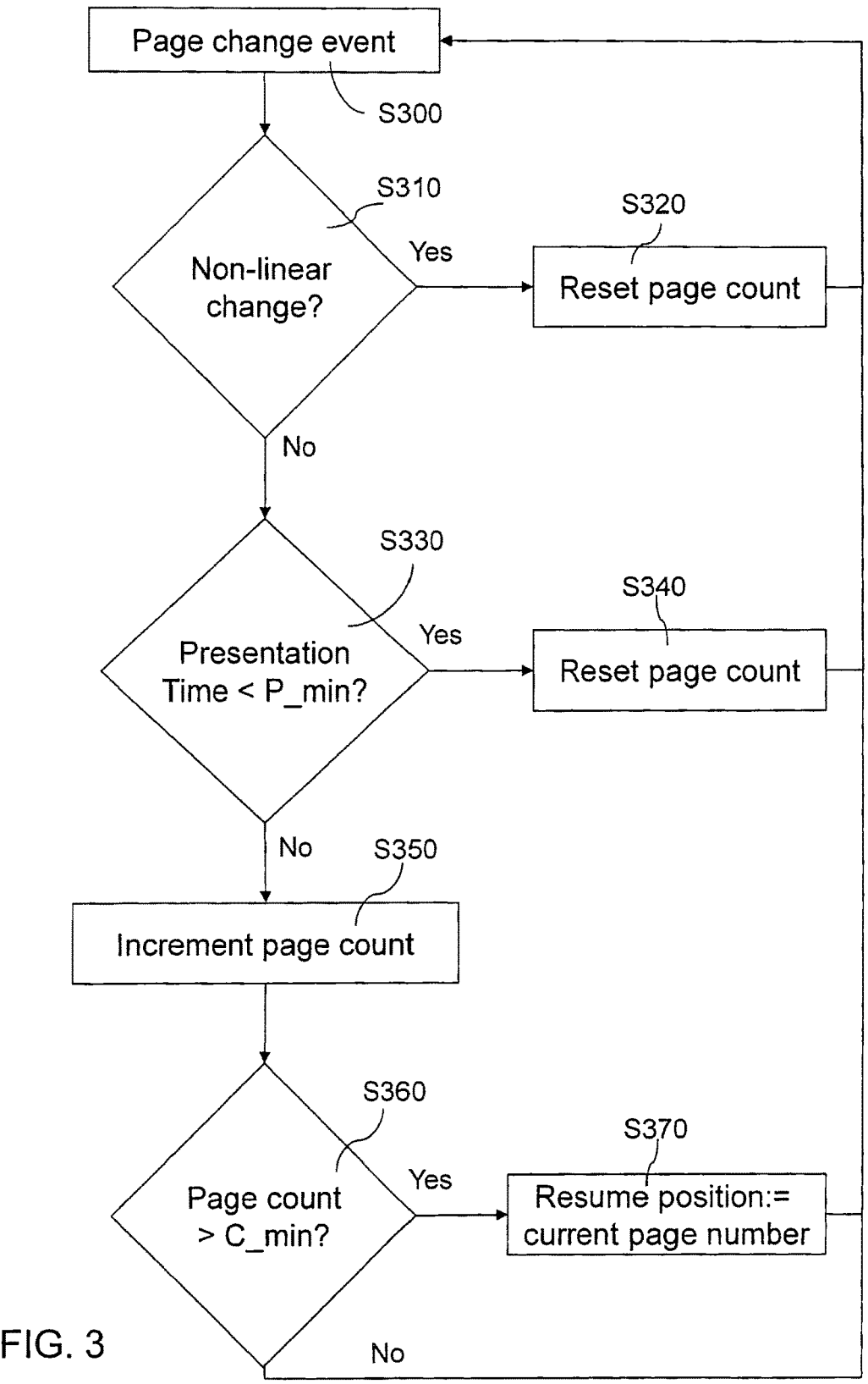
FIG. 3 shows a flow-chart of a method according to a further embodiment.

FIG. 3 illustrates a flow-chart of a method according to this embodiment. The procedure starts at S300 at a page change event. For example, a page change event may be a page-forward, a page-backward operation, a jump to a specific page or a jump to the Table of Contents operation. At S310, it is determined whether this page change event corresponds to a non-linear change. For example, a page back or a jump to the Table of Contents operation may be a non-linear change. If the change event is a non-linear change, the procedure goes to S320, at which the page count is resetted.

According to the present embodiment, the page count corresponds to the reference position marker of FIGS. 1 and 2. The page count may determine a reference position for determining at which a linear reproduction has started.

If it is determined at step S310 that there has been no non-linear change, the procedure proceeds to S330, where it is determined whether the presentation time is <P_min or not. The presentation time may be measured from the last page change event, e.g. a linear or a non-linear change. For example, a user may jump to a certain position within the document and then read further. In this case, the presentation time may be measured from the last change event. If the presentation time is smaller than P_min, the procedure goes to S340 where the page count is resetted again. The determination at step S330 finds out whether the current page is only selected for going to the next page and further on or whether the currently selected page has been actually read. If it is determined at step S330 that the presentation time is larger than P_min, the page count is incremented at S350. As will be explained later, instead of or in addition to measuring the presentation time, determining whether the presentation time is larger or smaller than P_min may be performed using different methods, e.g. using a sensor.

It is determined at S360 whether the page count is larger than C_min. If it is determined that the page count is larger than C_min, at S370 the resume position is set to the current page number. If the page count is smaller than C_min, the procedure proceeds directly proceeds to S300 without changing the resume position. The determination at S360 may basically correspond to the determination at S111 to find out whether linear reproduction of the content has been performed for a sufficient period or number of pages so that the reproduction progress exceeds a threshold value.

For example, the limit for the presentation time P_min may depend on the content shown on the page. According to an embodiment, the number of words or characters may be used to determine the threshold presentation time. For example, depending on the character size, the number of words per page and, consequently, the minimum time required for reading a page may vary. Further, the threshold presentation time may depend on the reading habits of a user. For example, this may be estimated from the reading history of a certain reader or user. The threshold presentation time may further depend on the content type. For example, a novel may require less time to read per page compared to technical literature. The device may further comprise a sensor (not shown in this drawing). The sensor may track an eye movement of a user. Accordingly, the device may recognize whether the user is actually reading the text or not and correspondingly adapt P_min. According to this embodiment, determining whether linear reproduction takes place may further take into account information provided by the sensor. According to a further embodiment, determining whether the presentation time is smaller or larger than P_min may be based on information provided by the sensor. For example, it may be determined that the presentation time is larger than P_min if the sensor has detected that the user has read a certain number such as five or more lines of the document.

According to embodiments, the threshold presentation time may be a fixed value that may be determined from observation on test devices. Alternatively, a user may input these values. Further, the threshold value C_min may be input by a user, or it may be determined from a user's behaviour. For example, C_min may be 1 to 5 pages.

According to a further embodiment, the above described rule base determination of the resume position may be replaced by a machine learning method. All available input events might be used as input for both learning and classification. For example, depending on a user's behaviour, the system may "learn" which input events relate to a non-linear event and which input events relate to linear reproduction. Data from real users might be collected and annotated with real events of a user. These data may then be used to learn the real presentation setting events from the input events. Further, in order to address the individual behaviour of different users, the data from a group of users might be clustered. The device parameter such as the average page view time might be used to assign a user to one of the clusters and use the optimized statistics for that cluster. For example, the system may recognize that a user who reads one page of a book of a first genre (novel) in a first period of time will need approximately a second period of time for a book of a second genre (non-fiction book).

According to a further embodiment, several users may read the same e-book on the same e-book reader. For example, when one e-book reader is used by several users, the e-book reader may store the resume position, when another user starts reading. For example, when a first user has read already a certain number of pages, and a second user starts reading, the e-book reader may recognize that a second reader starts reading, since the second user starts at a position different from the last reading position of the first reader. Accordingly, depending from the specific reading position, the resume positions assigned to the readers may be distinguished. Determining the resume position may be accomplished in the manner as has been described above with reference to FIG. 3. According to a further embodiment, the e-book reader may distinguish between the different readers taking into account the different reading time that is needed to read a page. For example, when actuating a dedicated button or starting to read, the e-book reader may offer the different resume positions assigned to the first and the second users by way of a list. According to a further embodiment, the resume positions of the different users may be accessed by repeatedly actuating the dedicated button.

Figure 4:
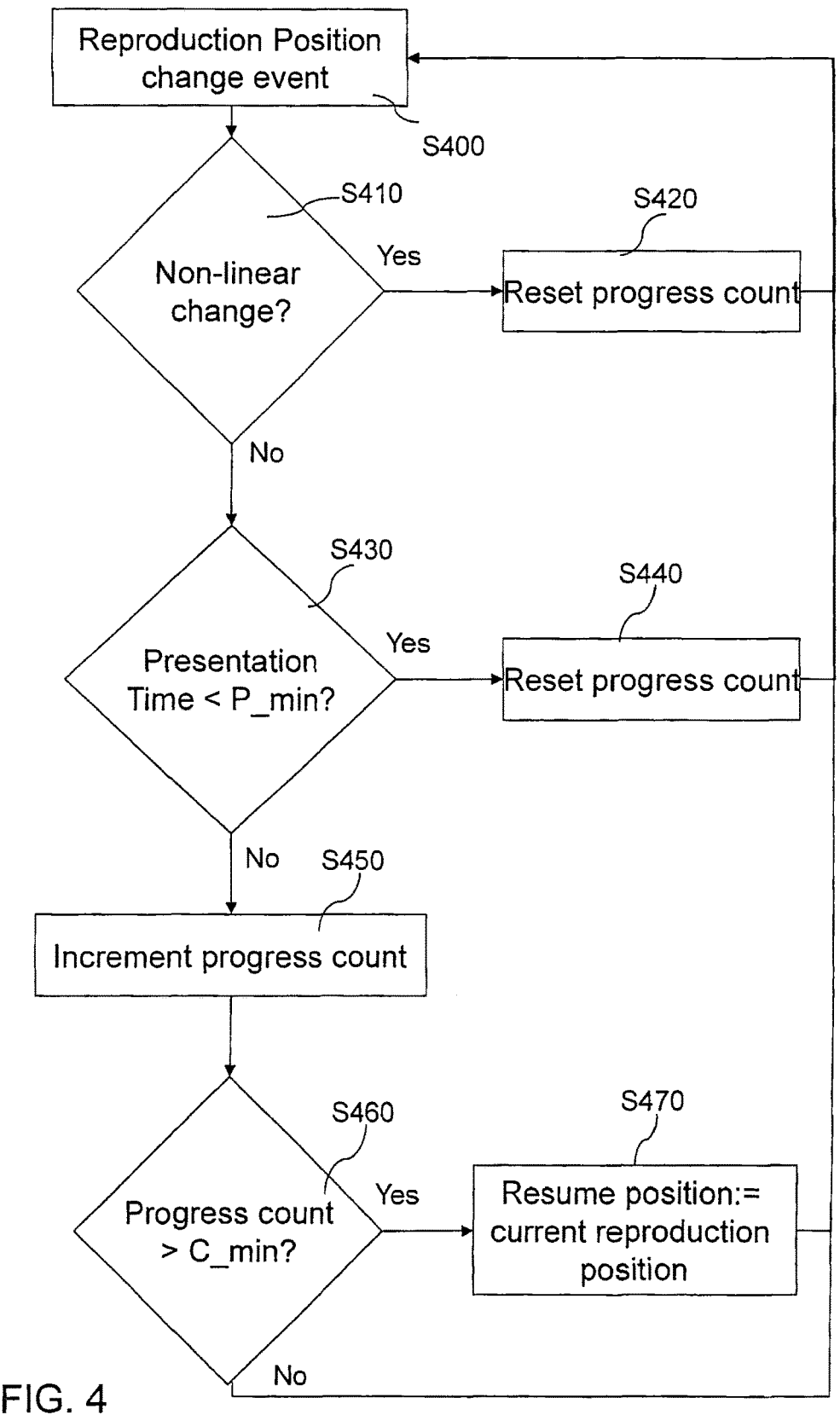
FIG. 4 illustrates a flow-chart of a method according to a further embodiment.

FIG. 4 shows an embodiment according to which the content to be reproduced is a text document, and the device for reproducing the content may be a computer, a PDA or a similar device. For example, a user may perform a search in the Internet by, for example, reading a main document and following several links. In this case it may be desirable to jump back to the main document. According to a further embodiment, the user may edit a document by inserting text and performing copy and paste operations for example. In this case, it may be useful to return to a resume position after performing a jumping operation.

For example, the reproduction position may correspond to a line number, and the reproduction progress and the threshold value may correspond to a progress count. For example, the progress count may be a line count. The procedure may start at S400, when a reproduction position change event takes place. For example, the reproduction position change event may comprise a "Page down", "Move a certain Number of Lines down", "Page up", "following a Link" operation and others. At step S410, it is determined whether this reproduction position change event refers to a non-linear change or not. A non-linear change may correspond to a "Page up" or a "following a Link" operation, for example. If the reproduction position change event is a non-linear change, the progress count is resetted at step S420, and the procedure proceeds to step S400. At step S430, it is determined whether the presentation time is larger or smaller than P_min, wherein P_min depends on whether the reproduction position change event has been "Page down" (requiring more reading time) or "Move a certain Number of Lines down" (wherein P_min depends on this number of lines). For example, this may comprise measuring the presentation time and comparing the presentation time with a threshold value. According to a further implementation, this may be accomplished using a sensor that tracks an eye's movement and finds out how many lines have been reproduced consecutively. In a similar manner as has been discussed above, if the presentation time is smaller than P_min, the progress count may be reset at S440. If the presentation time is larger than P_min, the procedure proceeds to step S450.

At step S450, the progress count is incremented in a similar manner as is described with reference to FIG. 3. At step S460, it is determined whether the progress count is larger than C_min. If the progress count is larger than C_min, the resume position is set to the current progress position. Further elements of this embodiment are similar to the embodiment described with reference to FIG. 3.

According to a further embodiment, the method further may comprise storing the presentation time. For example, when viewing the search history, the web pages having the largest presentation time may be displayed as a list, or the web pages may be sorted or classified in accordance with their presentation time. According to an embodiment, the method further may comprise measuring and storing the progress count. In a similar manner, when viewing the search history, the web pages having the largest progress count may be displayed as a list, or the web pages may be sorted or classified in accordance with their progress count.

Figure 5:
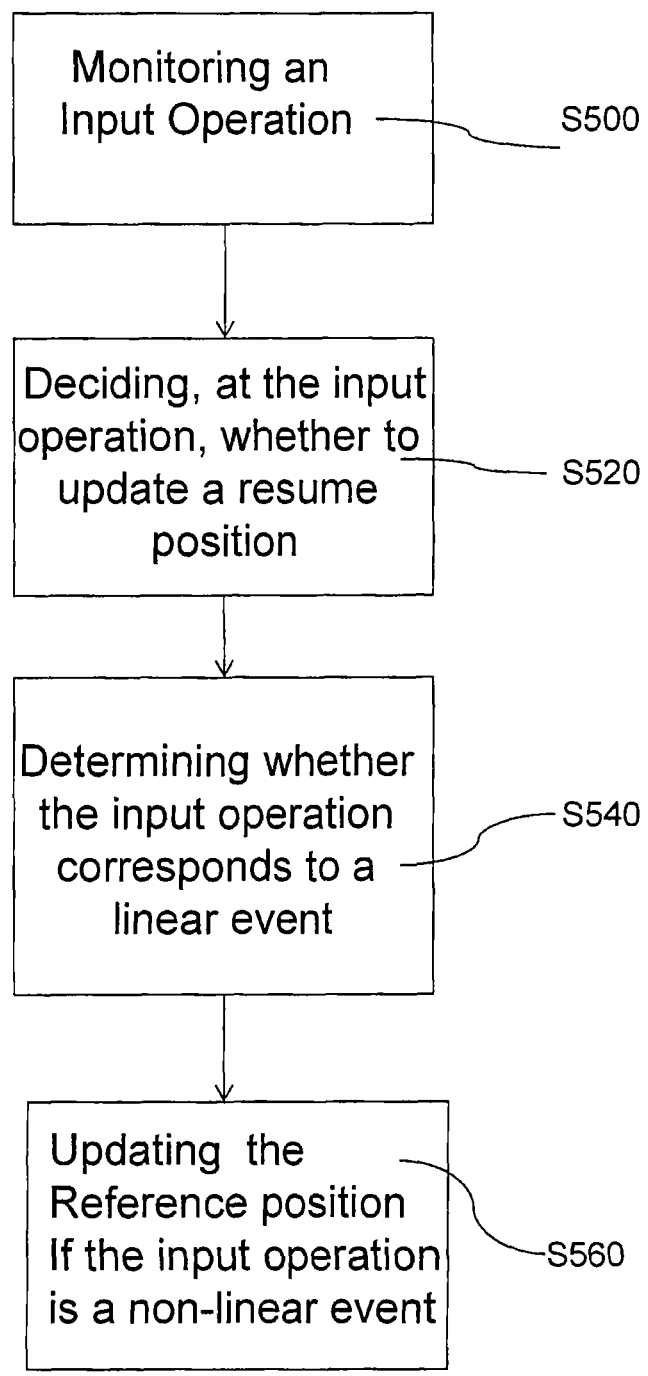
FIG. 5 illustrates a flow-chart of a method according to a general embodiment.

FIG. 5 illustrates a method according to a more general embodiment. As is shown, a method of reproducing a content item may comprise monitoring an input operation (S500) and deciding (S520), at the input operation, whether to update a resume position, based on a reproduction progress, the reproduction progress being determined with respect to a reference position. The method further comprises determining (S540) whether the input operation corresponds to a linear or to a non-linear event and updating (S560) the reference position, if the input operation is a non-linear event.

For example, the reference position may be resetted to a future reproduction position at which a linear reproduction will start. In this case, resetting the reference position may comprise deleting the reference position marker and setting the reference position marker to a reproduction position at which linear reproduction starts. Differently stated, at a non-linear input operation the reference position is shifted to a future reproduction position.

According to an embodiment, this method may be used for reproducing arbitrary content as has been defined above. For example, when the content to be reproduced is an e-book or a text document, linear reproduction may be determined in the manner as has been described above. According to further embodiments, linear reproduction may be detected without determining whether the presentation time is larger than P_min. For example, linear reproduction may be determined from the fact that the user "actively" consumes the content or performs some kind of tracking, for example, by correspondingly moving a cursor or using his finger. According to a further implementation, a sensor may detect that the user performs linear reproduction.

For example, when applying the method to the edition of a text, an editing operation may be regarded as an input operation initiating linear reproduction. Accordingly, at step S500, an input operation is monitored. At an input operation, it is decided whether to update a resume position (S510). For example, the resume position may be set to the current reproduction position if the reproduction progress exceeds the threshold value. The threshold value may, for example, be a line count. The threshold value may be selected from the range of 1 to 15 lines, for example. When a skipping process is initiated while editing the text, it is determined that the input operation corresponds to a non-linear event. A non-linear event will result in an updating of the reference position. After jumping within the document without performing an editing process, upon activating a dedicated button or entering a command, reproduction will be continued from the set resume position. For example, performing a copy operation or a paste operation may be defined to be a non-linear event.

According to a different interpretation, in a method of reproducing a content item, a resume position is set to be a current reproduction position, if a reproduction progress that corresponds to a difference between the current reproduction position and a reference position is larger than a threshold value. The reference position is shifted by a non-linear operation.

Applying these methods, a device for reproducing a content item may keep a current reproduction position based on the user inputs along the time line. Thereby, resuming reproduction from the position where it was really stopped, is enabled. The general idea is to accept a position as a resume position when the consumer consumed the media in a linear way over a certain time period. When a user consumes only a short part of the media after a non-linear positioning within the media, it may be ignored and not accepted as a resume position.

Figure 6:
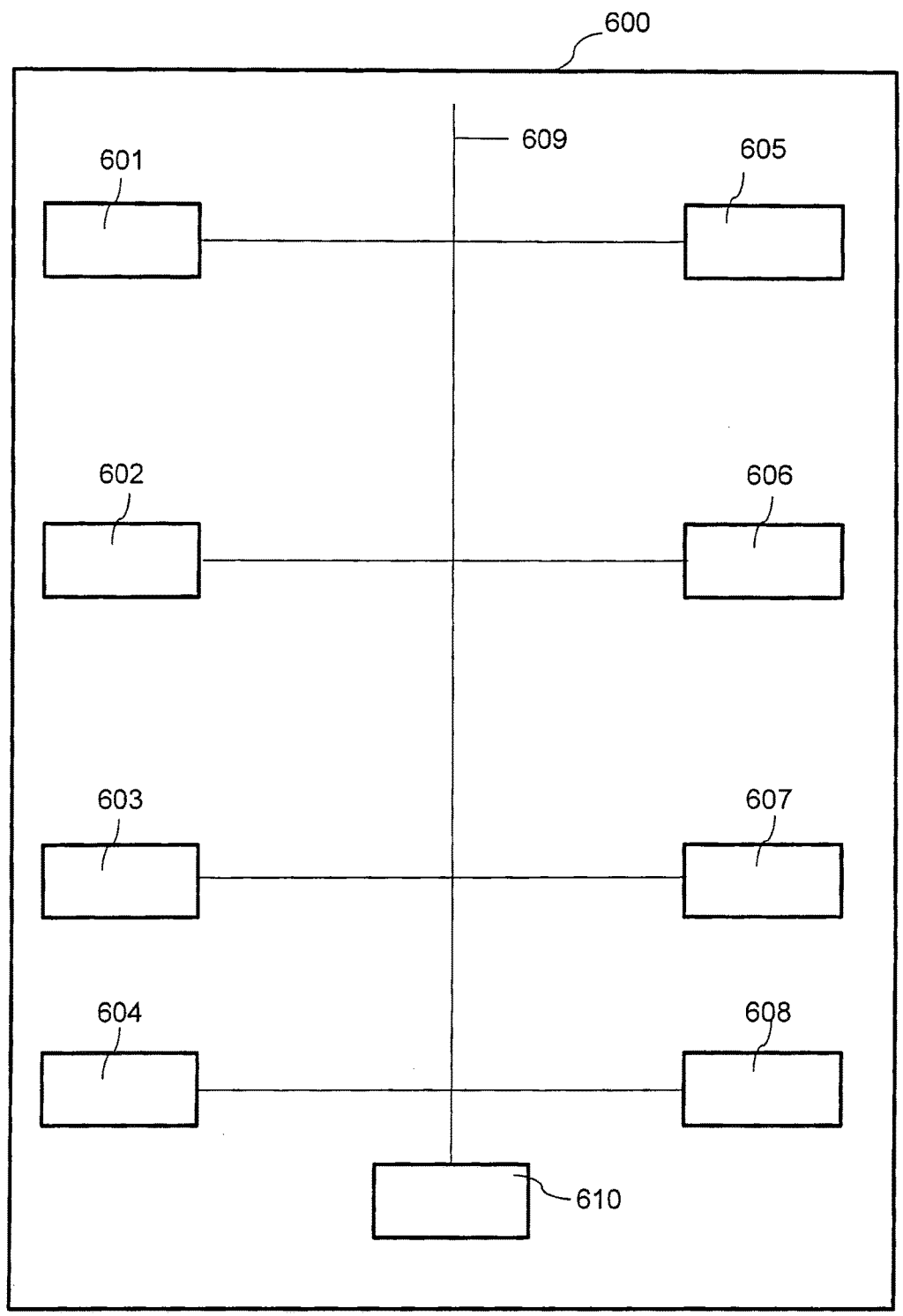
FIG. 6 schematically illustrates a device for reproducing a content according to an embodiment.

FIG. 6 shows a schematic view of device for reproducing a content 600 according to an embodiment. The device for reproducing a content item comprises a processor 601 that is configured to control the device for reproducing a content item on the basis of an input signal or a program. The device 600 may further comprise a memory 602 for storing a content to be reproduced. For example, the memory 602 may comprise a hard disk or any other kind of storage device which is commonly used in electronic devices. Additionally or alternatively, the memory 602 may comprise a non-volatile memory. The device may further comprise an interface 603 to an external storage medium such as a DVD, a CD, a USB memory or any other kind of memory card which may be used for externally storing content.

The device may further comprise operating members 604 or an interface to external operating members such as a keyboard, a mouse, dedicated buttons and others. By activating any of these operating members, the operations performed by the processing device 601 may be further controlled. The device may further comprise a display 605 for displaying a content to be reproduced. The display may be implemented using any suitable technology such as using one or more of a LCD display, LED display, organic-LED display, a cathode ray tube, electronic paper display, electrophoretic display, PMOLED ("passive matrix organic light emitting diode") display and AMOLED ("active matrix organic light emitting diode") display. According to a further implementation, the device 600 may comprise an interface to an external display.

Further, the display 605 may display a graphical user interface (GUI) by which the processing device 601 may further be controlled. As is to be clearly understood, according to embodiments, the display 605 may be dispensed with. For example, the operating members 604 and/or the graphical user interface may include buttons or operating elements for performing an input operation as discussed above with reference to FIGS. 1 to 4. For example, the buttons or operating elements may be actuated to perform a playback operation, a fast forward/backward operation or any arbitrary skipping operation. Further the buttons or operating elements may be actuated to perform a resume operation to jump to the resume position in order to resume a linear reproduction process. According to an embodiment, upon actuating the buttons or operating elements, a list including different resume positions may be displayed. Still further, by repeatedly actuating the buttons or operating elements, the device may jump to different resume positions.

The device further may comprise speakers 606 for outputting a content that is currently reproduced. The device for reproducing a content item may further comprise a read-only memory (ROM) 607 that may store a control program for the processing device 601. The device for reproducing a content may further comprise an interface 608 for communicating with a network, for example LAN or WLAN. The device 600 may further comprise a CPU bus 609 including an address bus, a data bus and a control bus. Nevertheless, as is to be clearly understood, any alternative configuration of device for reproducing a content item may be utilized.

According to an embodiment, the device for reproducing a content item may be any kind of music player, comprising an MP3 player, a personal digital assistant (PDA), a cell phone, an e-book reader, a tablet computer and any other kind of computer which is generally used. In particular, the device for reproducing a content item may be any of the devices listed above, further comprising a dedicated software so as to perform the functionality described above. According to an embodiment, a computer program may be stored at a specific location within the device 600. For example, the program may be stored on the memory 602 or in the read-only memory 607. According to a further embodiment, the program may be stored on the storage medium that interfaces with the interface 603. According to an example, a disk may include a content to be reproduced and a computer program instructing the processor to perform the method according to an embodiment.

For example, the processor 601 may be configured to monitor an input operation and to decide, at the input operation, whether to update a resume position, based on a reproduction progress, the reproduction progress being determined with respect to a reference position. The processor 601 may be further configured to determine whether the input operation corresponds to a linear or to a non-linear event. The processor 601 may be further configured to update the reference position, if the input operation is a non-linear event. The device may store the resume position in the non-volatile memory 602, for example, or in a volatile memory. According to a further embodiment, the resume position may be stored in combination with the content to be reproduced, for example, on an external storage medium.

The content to be reproduced may be stored in an internal memory or in an external memory of the device 600 for reproducing a content item.

According to a further embodiment, the device 600 may further comprise sensors 610 that may be used to get further information on the users activities. For example, the sensor 610 may be a motion sensor which detects when the user takes a break. Further, the sensor 610 may comprise a camera which tracks the eye movement of the user. Thereby, determining whether the content is linearly reproduced may be assisted. For example, it can be determined more reliably, whether the user is actually reading, for example. For example, the camera may be mounted to the display member 605.

Further, according to the embodiment described above, the current page of a textbook will be recognized as a current reading position. According to a further embodiment, a certain line may be tracked as the current reproduction position. For example, this can be accomplished using a camera that performs eye-tracking. According to a further embodiment, the position within a text page may be estimated from the viewing time of the page. For example, an approximate page position may be visualized by a marker that either permanently or on request displays a range within a page that corresponds to the current reading position. According to a further embodiment, the sensor may be a touchsensor that may track the user's reproduction position, when the user uses his finger for reading.

Figure 7:
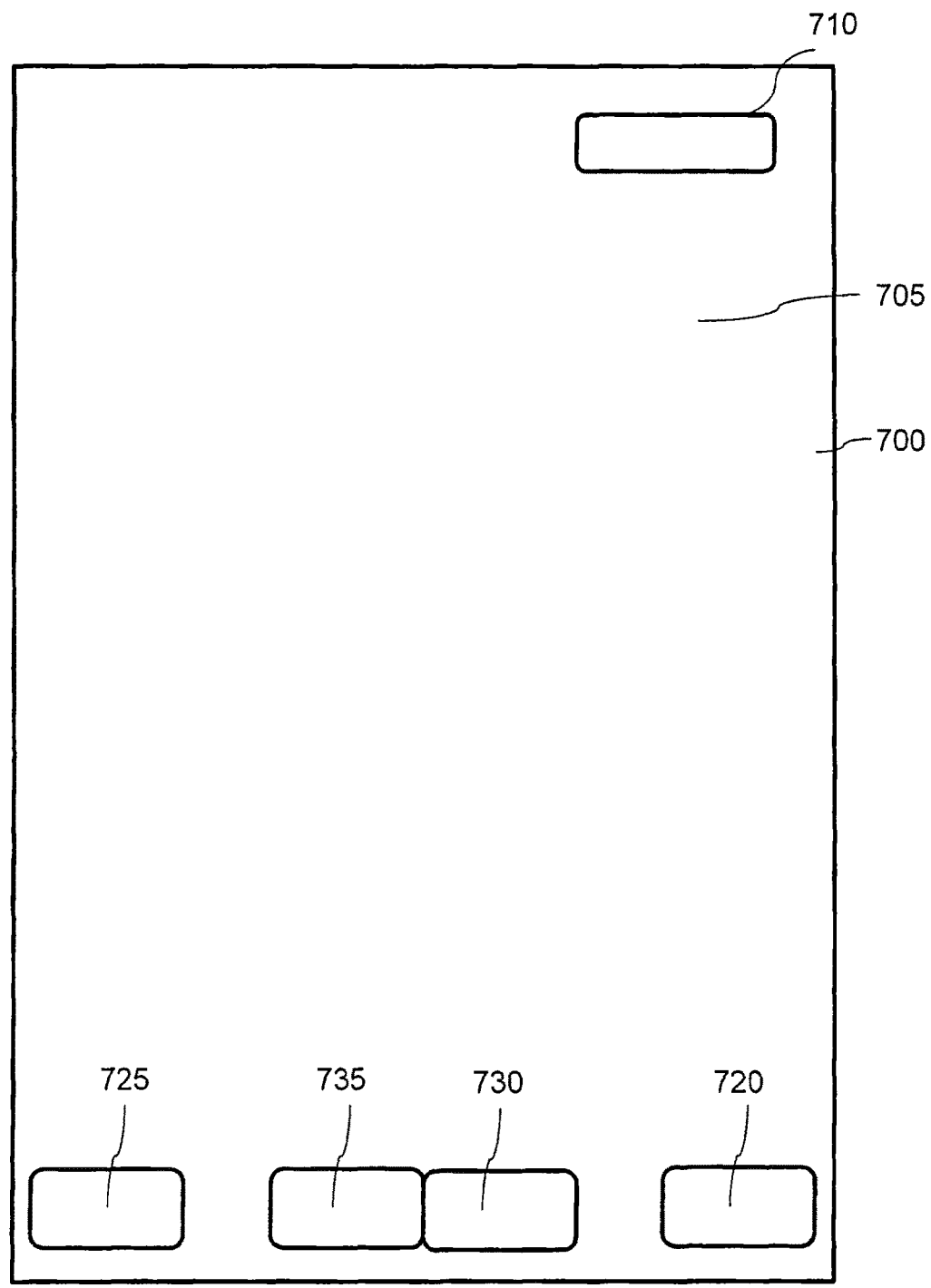
FIG. 7 illustrates a plan view of a device for reproducing a content according to an embodiment.

FIG. 7 illustrates a plan view of a device 700 for reproducing a content item according to an embodiment. The device 700 comprises a display 705, and operating members 720, 725, 730, 735. For example, the operating members 720, 725, 730, 635 may be dedicated buttons. Alternatively, they may be implemented as a graphical user interface (GUI). As is to be clearly understood, some of the operating members may be implemented by dedicated buttons, the others being implemented as a graphical user interface. For example, the operating members 720, 725, 730, 735 may relate to a "page forward", "page backward", "jump to resume position" and "display menu" operation. The display 705 may be implemented in the manner as has been explained above. The display 705 further may comprise a sensor 710, for example a camera, that may track a user's eye movement, or a touchsensor.

A further embodiment relates to a computer program including computer-program instructions which when executed on a data processing apparatus cause the data processing apparatus to perform the method as explained above. An embodiment relates to a non-transitory computer-readable medium including this computer program.

The computer program may be run on any known processing device, such as a computer, a PDA, a notebook, a cell phone, an e-book reader and others. According to an embodiment, the computer program may be stored on a non-transitory computer-readable recording medium. For example, the computer-readable recording medium may further store the content to be reproduced.

Figure 8:
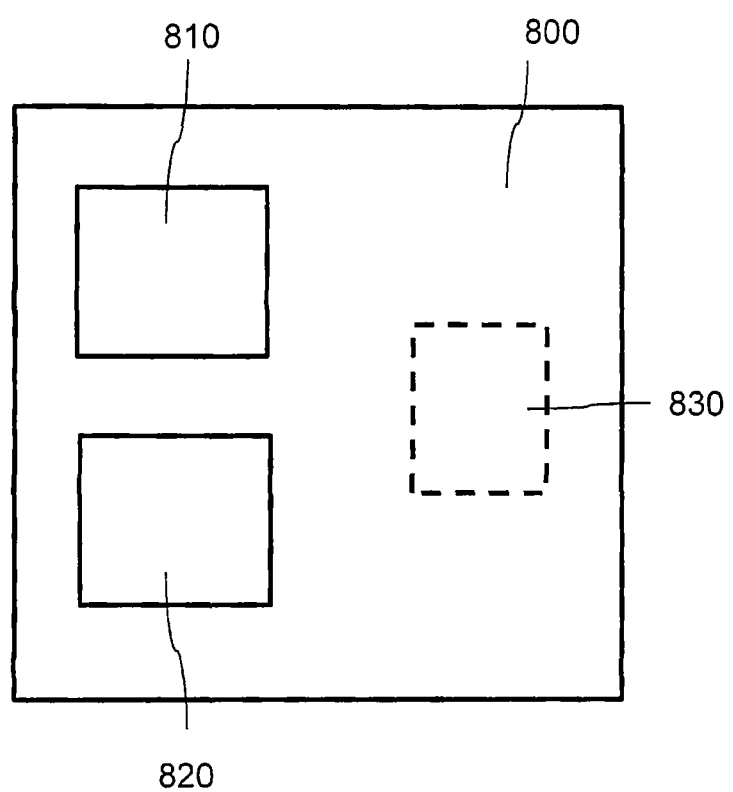
FIG. 8 illustrates a recording medium according to an embodiment.

FIG. 8 shows an example of a non-transitory computer-readable recording medium 800 that may include the computer program 810 as described above. According to an embodiment, the recording medium 800 may further comprise the content 820 to be reproduced. According to a further embodiment, the recording medium may include a memory portion 830 which may store the resume position. The non-transitory computer-readable recording medium may include any kind of commonly known recording media such as a CD (Compact Disc), DVD (Digital Versatile Disc), BluRay Disc, recording media including a flash memory, for example, memory cards or USB (Universal Serial Bus) sticks and others.

Figure 9:
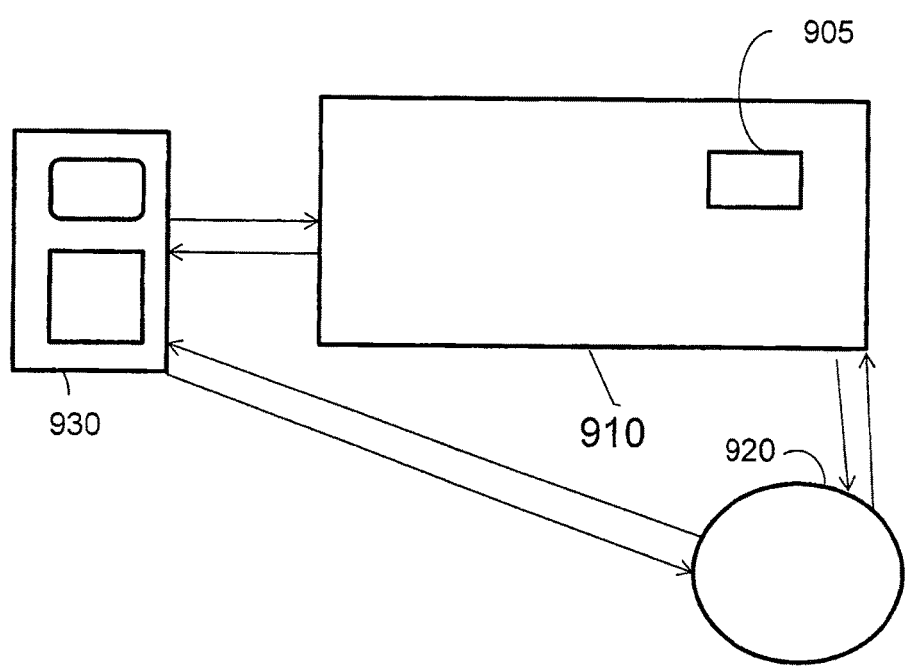
FIG. 9 illustrates a configuration comprising a server according to an embodiment.

FIG. 9 illustrates a further configuration including a server 910, a memory 920 and a reproduction device 930. The memory 920 may be a component of the server 910 or may be implemented separate from the server 910. For example, the memory 920 may be implemented in a second server that is separate from the server 910. The memory 920 may store a content item to be reproduced by the reproduction device 930. The server 910 is configured to cooperate with the reproduction device 930. The server 910 comprises a processor 905 configured to determine a resume position, the processor 905 being configured to receive a signal indicating an input operation from the reproduction device 930, and to decide, at the input operation, whether to update a resume position, based on a reproduction progress, the reproduction progress being determined with respect to a reference position.

The processor 905 is further configured to determine whether the input operation corresponds to a linear or to a non-linear event, and to update the reference position if the input operation is a non-linear event.

The server 910 is further configured to store the resume position in a memory after determining the resume position. For example, the server 910 may store the resume position in the memory 920 which also stores the content item. The server 910 may further be configured to control reproduction to be resumed from the stored resume position.

The following description relates to a further embodiment of the method of reproducing a textbook or an e-book. As has been explained above, in such a case, the content item may be regarded as being reproduced in a discrete manner, i.e. by changing pages, for example.

Figure 10:
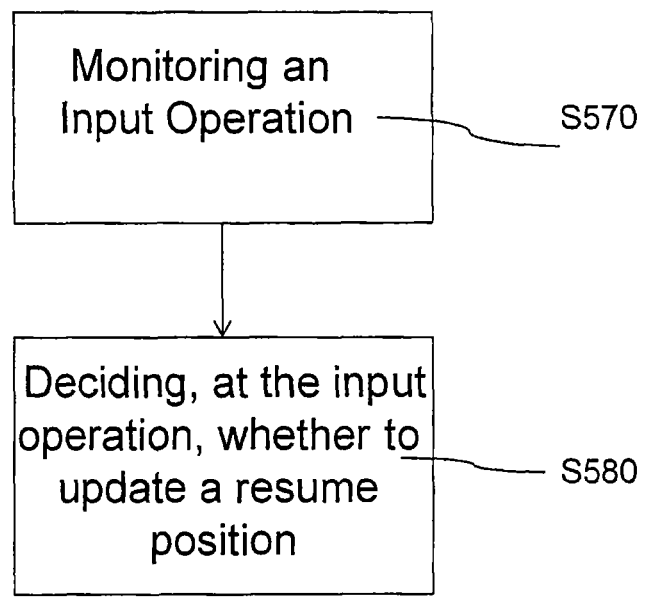
FIG. 10 illustrates a method for reproducing a readable document on a display.

FIG. 10 illustrates a flow-chart of a method of reproducing a textbook or an e-book that may be reproduced by changing pages, for example. As is illustrated, a method of reproducing a readable document on a display may comprise monitoring an input operation (S570) and deciding, at the input operation, whether to update a resume position (S580) based on a reproduction progress, the reproduction progress being determined with respect to a reference position.

According to an embodiment, a reference position may be set to a position at which reproduction of the readable document starts. At an input event, a page may be changed, for example, to the next page that is to be viewed or read by a user. For example, after such a page change event, the page count may be increment. Further, deciding whether to update a resume position may comprise determining whether the page count exceeds a threshold C_min. For example, the C_min may be a predetermined number of pages, such as 1 to 5 pages, for example 3 or 4 pages, to ensure that the user has actually read these pages. C_min may be input by a user or may be determined from a user's behaviour. If the page count exceeds the threshold, the resume position may be updated, e.g. to the current page. On the other hand, if the page count does not exceed the threshold, the resume position may not be updated.

According to a further embodiment, the decision whether to update a resume position may be based on an evaluation of the presentation time of the page at which the input operation was performed. For example, after each page change event, the presentation time of the current page may be measured and compared with a threshold value P_min. If the presentation time is larger than the threshold value P_min, it is decided to update the resume position. If the presentation time is smaller than the threshold value P_min, the resume position is not updated. Further details with respect to the threshold value of the presentation time have been explained hereinbefore.

According to a further embodiment, instead of measuring a presentation time, a sensor may track the reader's eye movement and assess the presentation time or a reproduction progress. For example, the sensor may recognize that the user has read five consecutive lines. The sensor may accordingly detect that the presentation time or the reproduction progress was sufficient to update the resume position to the current reproduction position. In this context, the term "reproduction progress" may refer to a number of lines of a document even though the readable document is reproduced in a discrete manner by changing pages.

According to a further embodiment, several users may read the same e-book on the same e-book reader. For example, when one e-book reader is used by several users, the e-book reader may store the resume position, when another user starts reading. For example, when a first user has read already a certain number of pages, and a second user starts reading, the e-book reader may recognize that a second reader starts reading, since the second user starts at a position different from the last reading position of the first reader. In this case, the e-book reader may set a second reference position for the second reader and count a second page count. The e-book reader may set a second resume position if the second page count exceeds a threshold value, the second page count being measured with respect to the second reference position. Accordingly, depending from the specific reading position, the resume positions assigned to the readers may be distinguished. Determining the resume position may be accomplished in the manner as has been described above with reference to FIG. 1. According to a further embodiment, the e-book reader may distinguish between the different readers taking into account the different reading time that is needed to read a page. For example, when actuating a dedicated button or starting to read, the e-book reader may offer the different resume positions assigned to the first and the second users by way of a list. According to a further embodiment, the resume positions of the different users may be accessed by repeatedly actuating the dedicated button.

The method of FIG. 10 may also be applied in a case in which the content item to be reproduced is a text document, and the device for reproducing the content item may be a computer, a PDA or a similar device. For example, a user may perform a search in the Internet by, for example, reading a main document and following several links. In this case, after some time, it may be desirable to jump back to the main document to the last reading position. According to a further embodiment, the user may edit a document by inserting text and performing copy and paste operations for example. In this case, it may be useful to return to a resume position after performing a jumping operation.

For example, the reproduction position may correspond to a line number or a page number. An input operation is monitored (S570). A reproduction position change event may take place as an input operation. For example, the reproduction position change event may comprise a "Page down", "Move a certain Number of Lines down", "Page up", "following a Link" operation and others. At S580, it may be decided whether to update a resume position, based on a reproduction progress, the reproduction progress being determined with respect to a reference position. For example, this may be accomplished by measuring the presentation time since performing the reproduction position change event. In more detail, according to the embodiment of FIG. 10, the reproduction progress may correspond to the presentation time, and the reference position corresponds to the time of the last input event. For example, it may be determined whether the presentation time is smaller than a threshold value P_min. According to an embodiment, P_min may depend on whether the reproduction position change event has been "Page down" (requiring more reading time) or "Move a certain Number of Lines down" (wherein P_min depends on this number of lines). If the presentation time is larger than P_min, it may be determined that the user has actually read the text for example, and the resume position may be updated. If the presentation time is smaller than P_min, it may be determined that the user has not read the text and the resume position may not be updated. According to an embodiment, instead of or in addition to measuring the presentation time, the reproduction progress may be determined using a sensor.

According to this embodiment, only input operations after "validly" reproducing the content item are tracked and result in an update of the resume position. For example, when performing a search in the internet, only web pages which the user has read for some time or for some lines may be stored as a resume position.

According to a further embodiment, the method further may comprise storing and further processing the presentation time. For example, this may be useful in cases in which a plurality of web pages are successively accessed. When viewing the search history, the web pages having the largest presentation time may be displayed as a list, or the web pages may be sorted or classified in accordance with their presentation time.

According to an alternative embodiment, the reproduction progress may correspond to a page count or a line count, and the reference position may correspond to the position at which reproduction has started or to the position when actuating one of a plurality of function keys. For example, the reference position may correspond to a position after performing a jumping operation. The method further may comprise measuring and storing the progress count or reproduction progress. In a similar manner, when viewing the search history, the web pages having the largest progress count may be displayed as a list, or the web pages may be sorted or classified in accordance with their progress count.

The device illustrated in FIG. 7, the non-transitory computer-readable recording medium of FIG. 8, and the configuration illustrated in FIG. 9 can be adapted to implement the embodiment illustrated in FIG. 10. In particular, the device illustrated in FIG. 7 may be suitable for reproducing a readable document on a display. The processor being a component of the device of FIG. 7 may be configured to monitor an input operation, and to decide, at the input operation, whether to update a resume position, based on a reproduction progress, the reproduction progress being determined with respect to a reference position. In particular, further components of the device may be implemented in the manner as has been explained above with reference to FIG. 7. In a similar manner, the server that is a component of the system of FIG. 10 may be implemented in a corresponding manner.

As is to be clearly understood, the foregoing discussion discloses and describes merely exemplary embodiments. As will be understood by those skilled in the art, embodiments may be embodied in other specific forms without departing from the spirit or essential characteristics thereof. Accordingly, the present disclosure is intended to be illustrative, but not limiting of the scope, as well as other claims. Elements of embodiments may be combined with elements of other embodiments. The disclosure, including any readily discernible variants of the teachings herein, define, in part, the scope of the foregoing claim terminology such that no disclosed subject matter is dedicated to the public.

Further embodiments are reflected by the following itemized list:

Item 1. A method of reproducing a content item, comprising:
  monitoring an input operation;
  deciding, at the input operation, whether to update a resume position, based on a reproduction progress, the reproduction progress being determined with respect to a reference position;
  determining whether the input operation corresponds to a linear or to a non-linear event;
  updating the reference position if the input operation is a non-linear event.

Item 2. The method according to item 1, wherein the resume position is updated to a current reproduction position, if it is determined based on the reference position that at least a predetermined reproduction progress through elements of the content item has been made, the current reproduction position corresponding to a reproduction position at the input operation.

Item 3. The method according to item 1 or 2, wherein the reproduction progress is determined by comparing the current reproduction position with the reference position, and the resume position is updated to a current reproduction position if the reproduction progress is larger than a threshold value.

Item 4. The method according to any of items 1 to 3, wherein determining whether the input operation corresponds to a non-linear event or to a linear event is performed before deciding whether to update the resume position.

Item 5. The method according to any of items 1 to 4, wherein deciding whether to update the resume position is performed before determining whether the input operation corresponds to a non-linear event or to a linear event.

Item 6. The method according to any of items 1 to 5, wherein the content item is a readable document displayed on a display.

Item 7. The method according to item 6, wherein the content item is data representing a textbook and the reproduction position corresponds to a page number, the reproduction progress and the threshold value corresponding to a page count.

Item 8. The method according to item 7, wherein determining whether the input operation corresponds to a linear event comprises determining whether a presentation time of a page is larger than a threshold presentation time.

Item 9. The method according to any of items 3 to 6, wherein the content item is data representing a textbook and the reproduction position corresponds to a line number, the reproduction progress and the threshold value corresponding to a line count.

Item 10. The method according to any of items 1 to 5, wherein the content item is selected from the group consisting of a video content item and an audio content item.

Item 11. The method according to any of items 3 to 5, wherein the content item is selected from the group consisting of a video content item and an audio content item and the reproduction position corresponds to a reproduction time, the reproduction progress and threshold value corresponding to a time interval.

Item 12. The method according to any of items 1 to 11, wherein determining whether the input operation corresponds to a linear event comprises determining whether the input operation causes elements of the content item to be reproduced in an intended order.

Item 13. The method according to item 12, wherein determining whether the input operation corresponds to a non-linear event further comprises determining a velocity of reproduction, wherein the input operation corresponds to a linear event if the input operation additionally causes the elements of the content item to be reproduced in an intended velocity.

Item 14. The method according to item 10, wherein determining whether the input operation corresponds to a non-linear event comprises determining whether a user has activated an operation selected from the group consisting of a skip forward operation, skip backward operation, fast forward operation and a backward operation.

Item 15. The method according to any of items 1 to 14, further comprising determining whether a linear reproduction has started, including analyzing a user's behavior based on a sensor output.

Item 16. The method according to any of items 1 to 15, further comprising storing the resume position after determining the resume position.

Item 17. The method according to any of items 1 to 16, further comprising returning to the determined resume position.

Item 18. The method according to any of items 6 to 17, wherein the content item is reproduced on an e-book reader, further comprising determining a current user of the e-book reader and storing the resume position as a user-specific resume position.

Item 19. The method according to item 18, further comprising providing a selectable input device for resuming reproduction at the resume position.

Item 20. A device for reproducing a content comprising a processor configured to determine a resume position, the processor being further configured
to monitor an input operation;
to decide, at the input operation, whether to update a resume position, based on a reproduction progress, the reproduction progress being determined with respect to a reference position;
to determine whether the input operation corresponds to a linear or to a non-linear event; and
to update the reference position if the input operation is a non-linear event.

Item 21. The device according to item 20, further comprising a memory for storing the resume position after updating the resume position.

Item 22. The device according to item 21, being configured to resume reproduction from the stored resume position.

Item 23. The device according to any of items 20 to 22, wherein the content to be reproduced is a displayable content, the device further comprising a display for displaying the content.

Item 24. The device according to item 23, further comprising a sensor for tracking an eye's movement upon content reproduction.

Item 25. A computer program including computer-program instructions which when executed on a data processing apparatus cause the data processing apparatus to perform the method of any of items 1 to 19.

Item 26. A non-transitory computer-readable recording medium including the computer program of item 25.

Item 27. The non-transitory computer-readable recording medium according to item 26, further comprising the content to be reproduced.

Item 28. A method of reproducing a readable document on a display, comprising:
monitoring an input operation;
deciding, at the input operation, whether to update a resume position, based on a reproduction progress, the reproduction progress being determined with respect to a reference position.

Item 29. The method according to item 28, further comprising:
determining whether the input operation corresponds to a linear or to a non-linear event;
updating the reference position if the input operation is a non-linear event.

Item 30. The method according to item 28 or 29, wherein the resume position is updated to a current reproduction position, if it is determined based on the reference position that at least a predetermined reproduction progress through elements of the content item has been made, the current reproduction position corresponding to a reproduction position at the input operation.

Item 31. The method according to any of items 28 to 30, wherein the reproduction progress is determined by comparing a current reproduction position with the reference position, and
the resume position is updated to the current reproduction position if the reproduction progress is larger than a threshold value,
the current reproduction position corresponding to a reproduction position at the input operation.

Item 32. The method according to any of items 29 to 31, wherein determining whether the input operation corresponds to a non-linear event or to a linear event is performed before deciding whether to update the resume position.

Item 33. The method according to any of items 29 to 31, wherein deciding whether to update the resume position is performed before determining whether the input operation corresponds to a non-linear event or to a linear event.

Item 34. The method according to any of items 31 to 33, wherein the reproduction position corresponds to a page number, the reproduction progress and the threshold value corresponding to a page count.

Item 35. The method according to any of items 31 to 33, wherein
the reproduction position corresponds to a page number, the reproduction progress and the threshold value correspond to a page count, and
determining whether the input operation corresponds to a linear event comprises determining whether a presentation time of a page is larger than a threshold presentation time.

Item 36. The method according to any of items 31 to 33, wherein the reproduction position corresponds to a line number, the reproduction progress and the threshold value corresponding to a line count.

Item 37. A device for reproducing a readable document, the device comprising a processor configured
to determine a resume position;
to monitor an input operation; and
to decide, at the input operation, whether to update a resume position, based on a reproduction progress, the reproduction progress being determined with respect to a reference position.

Item 38. The device according to item 37, wherein the processor is further configured:
to determine whether the input operation corresponds to a linear or to a non-linear event; and
to update the reference position if the input operation is a non-linear event.

Item 39. The device according to item 37 or 38, further comprising a memory for storing the resume position after updating the resume position.

Item 40. The device according to item 39, being configured to resume reproduction from the stored resume position.

Item 41. The device according to any of items 37 to 40, wherein the device further comprises a display for displaying the readable document.

Item 42. The device according to any of items 37 to 41, further comprising a sensor for tracking an eye's movement upon content reproduction.

Item 43. A server comprising a processor configured to determine a resume position, the server being configured to cooperate with a reproduction device, the processor being configured
to receive a signal indicating an input operation from the reproduction device; and
to decide, at the input operation, whether to update a resume position, based on a reproduction progress, the reproduction progress being determined with respect to a reference position.

Item 44. The server according to item 43, wherein the processor is further configured
to determine whether the input operation corresponds to a linear or to a non-linear event; and
to update the reference position if the input operation is a non-linear event.

Item 45. The server according to item 43 or 44, further being configured to store the resume position in a memory after determining the resume position.

Item 46. The server according to item 45, being configured to control reproduction to be resumed from the stored resume position.

The present application claims priority to European Patent Application 14 000 647.9, filed in the European Patent Office on Feb. 24, 2014, the entire contents of which being incorporated herein by reference.

The invention claimed is:

1. A method of reproducing a content item, comprising:
monitoring an input operation;
deciding, based on the input operation, whether to update a resume position, based on a reproduction progress, the reproduction progress being determined with respect to a reference position marker;
determining whether the input operation corresponds to a linear or to a non-linear event;
setting the reference position marker if the input operation is a linear event;
updating the resume position to a current reproduction position if the reference position marker is set, the input operation corresponds to a linear event, and a reproduction progress of the content item relative to the reference position marker is greater than a threshold value;
not updating the resume position to a current reproduction position if the reference position marker is set, the input operation corresponds to a linear event, and the reproduction progress of the content item relative to the reference position marker has progressed for a time that is less than the threshold value; and
deleting the reference position marker if the input operation is a non-linear event, wherein
the reproduction progress is determined by comparing the current reproduction position with the reference position marker, and
the content item is selected from a group consisting of an electronic document, a video content item, and an audio content item, and the reproduction progress and threshold value correspond to a line count for the electronic document, and a time interval for the video content item and the audio content item.

2. The method according to claim 1, wherein determining whether the input operation corresponds to a non-linear event or to a linear event is performed before deciding whether to update the resume position.

3. The method according to claim 1, wherein deciding whether to update the resume position is performed before determining whether the input operation corresponds to a non-linear event or to a linear event.

4. The method according to claim 1, wherein the content item is a readable document displayed on a display.

5. The method according to claim 4, wherein the content item is data representing a textbook and the reproduction position corresponds to a page number, the reproduction progress and the threshold value corresponding to a page count.

6. The method according to claim 5, wherein determining whether the input operation corresponds to a linear event comprises determining whether a presentation time of a page is larger than a threshold presentation time.

7. The method according to claim 1, wherein determining whether the input operation corresponds to a linear event comprises determining whether the input operation causes elements of the content item to be reproduced in an intended order.

8. The method according to claim 7, wherein determining whether the input operation corresponds to a non-linear event further comprises determining a velocity of reproduction, wherein the input operation corresponds to a linear event if the input operation additionally causes the elements of the content item to be reproduced in an intended velocity.

9. The method according to claim 1, wherein
the content item is selected from the group consisting of a video content item and an audio content item, and
determining whether the input operation corresponds to a non-linear event comprises determining whether a user has activated an operation selected from the group consisting of a skip forward operation, skip backward operation, fast forward operation and a backward operation.

10. The method according to claim 1, further comprising determining whether a linear reproduction has started, including analyzing a user's behavior based on a sensor output.

11. The method according to claim 4, wherein the content item is reproduced on an e-book reader, further comprising determining a current user of the e-book reader and storing the resume position as a user-specific resume position.

12. A device for reproducing a readable document, the device comprising a processor configured
to determine a resume position;
to monitor an input operation;
to decide, based on the input operation, whether to update a resume position, based on a reproduction progress, the reproduction progress being determined with respect to a reference position marker;
to determine whether the input operation corresponds to a linear or to a non-linear event;
to set the reference position marker if the input operation is a linear event;
to update the resume position to a current reproduction position if the reference position marker is set, the input operation corresponds to a linear event, and a reproduction progress of the content item relative to the reference position marker is greater than a threshold value;
to not update the resume position to a current reproduction position if the reference position marker is set, the input operation corresponds to a linear event, and the reproduction progress of the content item relative to the reference position marker has progressed for a time that is less than the threshold value; and
to delete the reference position marker if the input operation is a non-linear event, wherein
the reproduction progress is determined by comparing the current reproduction position with the reference position marker, and
the content item is selected from a group consisting of an electronic document, a video content item, and an audio content item, and the reproduction progress and threshold value correspond to a line count for the electronic document, and a time interval for the video content item and the audio content item.

13. The device according to claim 12, further comprising a memory for storing the resume position after updating the resume position.

14. The device according to claim 12, further comprising a sensor for tracking an eye's movement upon content reproduction.

15. A non-transitory computer-readable medium including computer-executable instructions, which when executed by an information processing device, cause the information processing device to:
monitor an input operation;
decide, based on the input operation, whether to update a resume position, based on a reproduction progress, the reproduction progress being determined with respect to a reference position marker;
determine whether the input operation corresponds to a linear or to a non-linear event;
set the reference position marker if the input operation is a linear event;
update the resume position to a current reproduction position if the reference position marker is set, the input operation corresponds to a linear event, and a reproduction progress of the content item relative to the reference position marker is greater than a threshold value;
not update the resume position to a current reproduction position if the reference position marker is set, the input operation corresponds to a linear event, and the reproduction progress of the content item relative to the reference position marker has progressed for a time that is less than the threshold value; and
delete the reference position marker if the input operation is a non-linear event, wherein
the reproduction progress is determined by comparing the current reproduction position with the reference position marker, and
the content item is selected from a group consisting of an electronic document, a video content item, and an audio content item, and the reproduction progress and threshold value correspond to a line count for the electronic document, and a time interval for the video content item and the audio content item.

* * * * *